United States Patent
Waldman et al.

(10) Patent No.: US 11,115,372 B2
(45) Date of Patent: Sep. 7, 2021

(54) UNIVERSAL ACTIONABLE NOTIFICATIONS

(71) Applicant: Microsoft Technology Licensing, LLC, Redmond, WA (US)

(72) Inventors: Lawrence Fubini Waldman, Kirkland, WA (US); Andrew Vincent Spiziri, Seattle, WA (US); Paresh Lukka, Redmond, WA (US); Anton Leo Dukeman, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/750,621

(22) Filed: Jan. 23, 2020

(65) Prior Publication Data
US 2021/0234827 A1    Jul. 29, 2021

(51) Int. Cl.
*H04L 12/58*  (2006.01)
*H04W 4/14*  (2009.01)

(52) U.S. Cl.
CPC ............ *H04L 51/36* (2013.01); *H04L 51/066* (2013.01); *H04L 51/24* (2013.01); *H04L 51/38* (2013.01); *H04W 4/14* (2013.01)

(58) Field of Classification Search
CPC ....... H04L 51/36; H04L 51/066; H04L 51/24; H04L 51/38; H04W 4/14
See application file for complete search history.

(56) References Cited

U.S. PATENT DOCUMENTS

| | | | |
|---|---|---|---|
| 7,308,093 | B2 | 12/2007 | Annadata et al. |
| 8,965,987 | B2 | 2/2015 | Lehmann et al. |
| 9,280,613 | B2 | 3/2016 | Smith et al. |
| 9,292,833 | B2 | 3/2016 | Savage |
| 9,503,415 | B2 | 11/2016 | Goulart et al. |
| 9,866,645 | B2 | 1/2018 | Sharda |
| 2015/0212675 | A1 | 7/2015 | Firstenberg et al. |
| 2016/0335710 | A1* | 11/2016 | Piper ................. G06F 3/048 |
| 2017/0092264 | A1 | 3/2017 | Hakkani-tur et al. |
| 2018/0004731 | A1 | 1/2018 | Brunn et al. |
| 2018/0083908 | A1 | 3/2018 | Dotan-cohen et al. |

OTHER PUBLICATIONS

"Manage Notifications in Teams", Retrieved From: https://support.office.com/en-us/article/manage-notifications-in-teams-1cc31834-5fe5-412b-8edb-43fecc78413d, Jun. 13, 2019, 2 Pages.
"Manage your Notifications", Retrieved From: https://mycoursessupport.spcollege.edu/manage-your-notifications.print, Jun. 13, 2019, 2 Pages.

(Continued)

*Primary Examiner* — El Hadji M Sall
(74) *Attorney, Agent, or Firm* — Schwegman Lundberg & Woessner, P.A.

(57) ABSTRACT

A notification service may act as an intermediary between message channels and/or other sources of actionable notifications and/or action items contained in messages, aggregating actionable notifications for a given recipient across multiple message channels and/or across multiple tools or services, sending notification messages with selectable response options to the recipient in a unified format, and processing the user's responses, e.g., by transmitting the responses back to the applicable sources.

15 Claims, 5 Drawing Sheets

(56) References Cited

OTHER PUBLICATIONS

Carter, Rebekah, "Managing Multiple Slack Workspaces, Accounts and Notifications", Retrieved From: https://dispatch.m.io/how-to-handle-multiple-slack-workspaces-accounts/, Apr. 10, 2019, 8 Pages.
Dantzich, et al., "Scope: Providing Awareness of Multiple Notifications at a Glance", In Proceedings of the Working Conference on Advanced Visual Interfaces, May 1, 2002, pp. 267-281.
"International Search Report and Written Opinion Issued in PCT Application No. PCT/US20/064145", dated Mar. 26, 2021, 12 Pages.

* cited by examiner

UNIVERSAL ACTIONABLE NOTIFICATIONS

TECHNICAL FIELD

The disclosed subject matter relates to user notification functionality, for example, as provided in online communication and collaboration platforms.

BACKGROUND

Online communication and collaboration platforms, (corporate) social networks, and the like often allow users to form, and join, groups organized around common interests or joint projects, and to exchange messages within "message channels" associated with these groups. Further, various tools or services available on the platforms may facilitate task assignments, scheduling, and similar functions by creating, based on user input, notification to other users, which may be posted to relevant message channels. The notifications may be "actionable" in the sense that they call for a response and provide multiple selectable response options. For instance, an event planning tool may generate invitations that request an RSVP, with response options including, e.g., "yes," "no," "maybe," and potentially the number of guests. As another example, a project management tool may generate a task assignment that allows the recipient to accept, reject, forward/escalate the task or indicate that it has been completed. Keeping up with actionable notifications received across multiple message channels and/or multiple tools or services can be a cumbersome and time-consuming chore for users, especially if notifications and responses are buried within a high volume of other messages. Additionally, to senders, the notification functionality provided by the platform tools may be of limited utility if available notification types and formats do not meet their needs, or if they want to expand their reach beyond platform users.

SUMMARY

Described herein is a software-implemented notification service that, in various embodiments, aggregates actionable notifications for a given recipient across multiple message channels and/or across multiple tools or services, sends notification messages to the recipient in a unified format, populates responses received from the notification recipient back to the relevant channels or tools/services, and optionally performs additional response processing.

In various embodiments, the notification service monitors message channels (or any other sources of messages) not, or not only, for actionable notifications in structured form, but extracts action items (herein understood as inquiries or requests that call for selection of one of multiple discrete response options) from unstructured messages and generates actionable notifications from these messages. In doing so, the notification service removes the strictures imposed by the predefined notification types supported by the platform, allowing users to send inquiries and requests (such as invitations, task assignments, etc.) to others in a more organic fashion, similar to offline interactions. Action item extraction may utilize explicit rules and heuristics, or a machine-learning model trained based on messages labeled with notification classifications.

In some embodiments, all actionable notifications, whether structured at the outset or created from unstructured text, are stored in a universal actionable notification data structure, each instance of the data structure specifying the notification text, one or more recipients, and a number of response options, along with an associated automated action (or set of actions) to be taken by the system. The data structure may, for example, take the form of a string, in which the aforementioned arguments are separated by specified delimiters. From the instances of the universal actionable notification data structure, notification messages are generated and sent to the respective recipients.

In various embodiments, the notification service accommodates different communication modes (characterized by different software or hardware to facility communication) by which notification messages can be transmitted. Notification messages may, for instance, be collected in a user's notification inbox within the platform (accessible when the user is logged in), sent to a notification application (app) on the user's smartphone (e.g., as an instant message), conveyed via email to the recipient's email account, or transmitted as a text message or robocall to the recipient's phone. Beneficially, enabling notifications via communication modes as commonly used as email, phone, or text can serve to significantly expand the pool of possible recipients, as it avoids the need for the recipient to have an account with, or otherwise use, the platform employed by the sender. In the following, any person that sends or receives a notification through the notification service is referred to as a "user" (regardless whether that person also is a user of a communication and collaboration platform, social network, or similar platform from which a notification may originate).

Depending on the communication mode, notification messages can be formatted in different ways; in particular, the manner in which the user selects a response may differ between communication modes. For example, an email or web form may include buttons for the response options, whereas a text or call may ask the user to respond by typing "Yes" or "No," or a number associated with the option they wish to select. The notification service may access a mapping table to determine the specific notification message format into which the actionable notification data structure instance is to be converted. In various embodiments, the communication mode is fixed per user, such that a given user receives all notification messages in a unified format and in a common manner (e.g., as emails or as text messages). In some embodiments, the communication mode associated with each user is inherently specified in the actionable notification data structure instances, which may list the recipients in terms of unique and communication-mode-specific addresses, such as email addresses or phone numbers.

Upon receipt of a response from a user, the notification service may take one or more actions specified in the respective instance of the actionable notification data structure. Such an action may involve forwarding the response (in a suitable format) to the message channel or tool/service from which the original notification came, or to some other applicable message channel or tool/service. For example, when a user accepts an invitation to an event, that response may be placed in the message channel where the invitation was issued, and may further be sent to a calendar or scheduling tool utilized by the user. Actions taken by the system may also include automated follow-up communications with the recipient of the original notification and/or the sender. For instance, when a recipient rejects an appointment (e.g., upon an initial appointment request or by canceling in response to a reminder), the notification service may communicate with a rescheduling tool associated with the sender and follow up with the recipient with an alternate appointment time. Further types and examples of automated actions taken based on response to notifications will occur to those of ordinary skill in the art. In general, any business logic used to process responses may be distributed in various ways between the notification service and tools associated with the sender or available within the platform from which a notification originates.

The foregoing summary introduces key concepts and selected aspects and features of the inventive subject matter, but is not intended as an exhaustive exposition of all embodiments of the subject matter herein sought to be patented, nor should it be construed as limiting the scope of the invention. The summary is intended to provide a flavor of notification services as contemplated herein, and the specifics and details mentioned in the summary should not be deemed as necessarily applicable to each embodiment.

BRIEF DESCRIPTION OF THE DRAWINGS

The foregoing will be more readily understood from the following detailed description of various embodiments, in particular, when taken in conjunction with the accompanying drawings.

DETAILED DESCRIPTION

Figure 1:
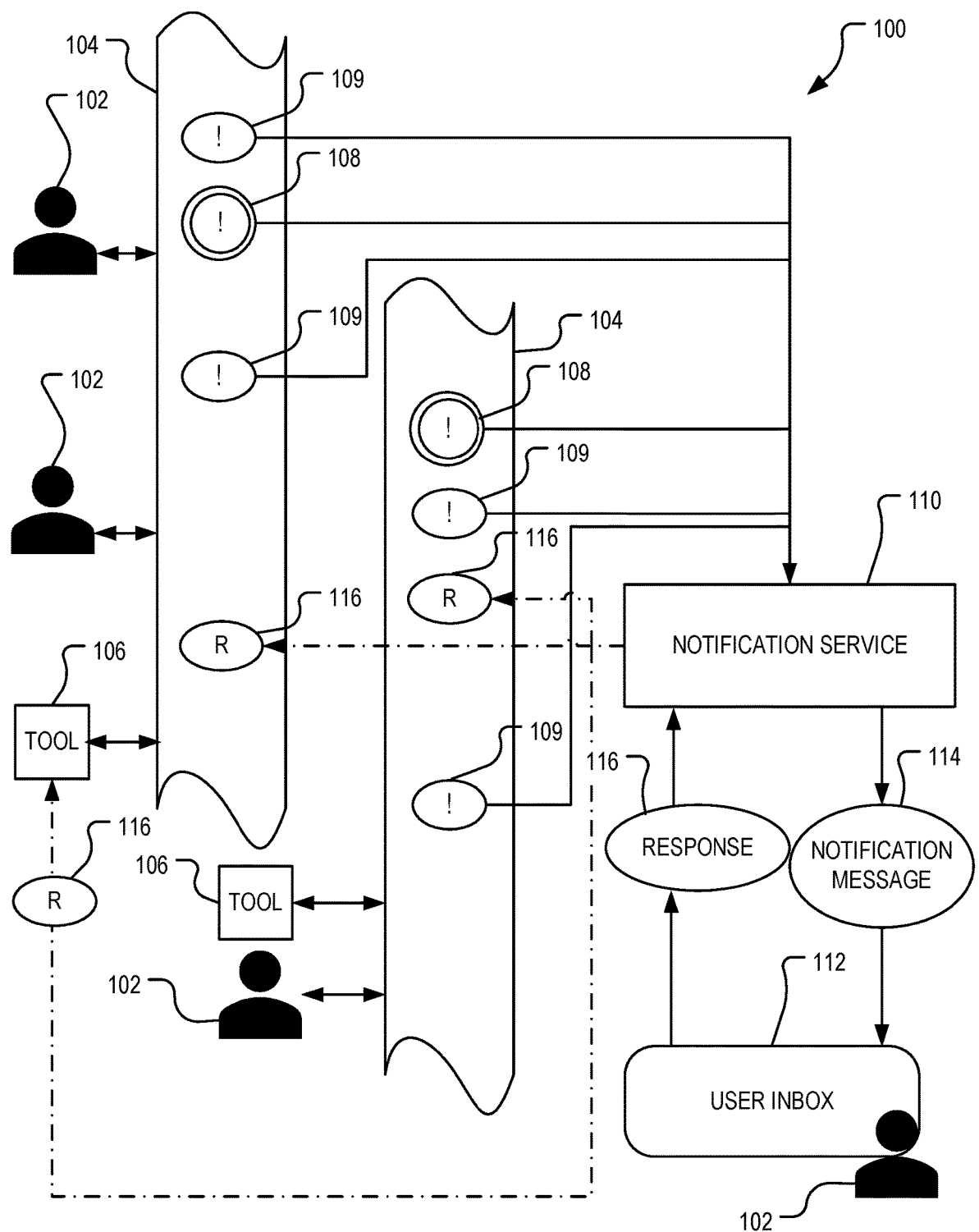
FIG. 1 is a schematic diagram of an example messaging ecosystem in accordance with various embodiments.

FIG. 1 illustrates an example messaging ecosystem 100 in accordance with various embodiments. The ecosystem 100 is generally implemented by a computer network including usually many computers (e.g., mainframe computers, minicomputers, and/or stationary or portable personal computers such as desktops, laptops, tablets, or smartphones) communicating over wired or wireless network links, e.g., within the internet or within an organization's intranet. The ecosystem 100 may, for instance, include a server or group of servers hosting a communication and collaboration platform for enterprise or private use, accessed by platform users via their client devices (such as desktop computers, smartphones, workstations, etc.). A non-limiting example of a commercially available such communication and collaboration platform that provides some of the functionality described below is MICROSOFT TEAMS.

Within the example messaging ecosystem 100, users 102 may form groups (e.g., corresponding to teams within a workplace, communities, social groups sharing common interests or hobbies, friends and families, etc.); a given user may be a member of one or of multiple groups. Members of a group can set up and exchange communications via message channels 104 surrounding certain topics or projects. A group may have only one associated message channel 104, or multiple channels 104, to carry conversation threads concerning multiple respective topics of interest to the group. Messages posted to a channel 104 are generally public to the group that owns the channel 104, such that each channel 104 functions like a (large) group chat. Users 102 may also be able to direct messages within a channel to specific other users 102, e.g., by including in the message the address "@name" for each user 102 to which the message is directed (where "name" stands for, e.g., the username of that user).

The ecosystem 100 may further include software tools 106 (e.g., provided as services within the communication and collaboration platform) that facilitate substantive collaboration and/or ancillary administrative acts, such as videoconferencing, document sharing, scheduling (of meetings, events, and the like), project management involving task assignment and tracking, etc.; examples of such tools 106 may include calendar and planner applications. These tools 106 may generate notifications, including actionable notifications 108, that may likewise be posted to the message channels 104. For example, a calendar tool may send reminders about upcoming meetings, which may include a request to respond with an indication whether the user will attend. Similarly, a task planner utilized by, say, a project manager, may automatically generate notifications to team members that have been assigned certain tasks, with embedded requests to confirm acceptance of the task, mark completion of the task, or forward/escalate the task. In some embodiments, a tool 106 may aggregate all notifications addressed to a given user 102 in a notification panel akin to an inbox.

To read and act on notifications 108 and messages containing action items 109, a user 102 may review the messages in the message channels 104 that are relevant to him and/or access notification panels in the tools 106 he utilizes. Doing so across multiple message channels 104 and/or tools 106 can be time-consuming and tedious. Further, when scanning through a large number of messages in a channel 104, the user 102 can easily miss important matters. To obviate these difficulties and provide a convenient way for the user 102 to review and respond to notifications and inquiries/requests, the messaging ecosystem 100 is enhanced, in accordance with the disclosed subject matter, with a notification service 110 that monitors all message channels 104 and/or tools 106 for actionable notifications 108 and/or action items 109 embedded in messages, and aggregates them per user 102 in a central location, herein referred to as the respective user's inbox 112. The inbox 112 may be provided within or external to the communication and collaboration platform, and may serve specifically for receiving actionable notifications, or receive other messages as well. For example, in some embodiments, the inbox 112 is provided as a notification inbox service within the platform; this notification inbox service may be accessible on the platform website when the user is logged in, and/or may push notification messages 114 onto the user's smartphone or other portable computing device via an app associated with the platform. In other embodiments, the user's general email account, or his SMS (aka text) inbox on his mobile phone, may serve as the inbox 112.

The type of inbox 112 and/or a user-specific configuration determine the communication mode by which the notification service 110 transmits notification messages 114 to a user 102. The communication mode, in turn, can affect the format of the notification messages 114 and the manner in which the recipient can respond. An email, or a webform as may be used for platform-internal notification messages 114, for instance, may include user-selectable graphic control elements such as buttons, radio buttons, drop-down menus, and the like that allow the recipient to choose a response. For a text message, the recipient may be asked to type or select a specific word, such as "YES" or "NO." The notification service 110 may also transmit the notification message 114 in the form of a call, which, when answered in person, may direct the recipient to select one of the response options by pressing a certain number (e.g., "Press '1' for 'yes' and '2' for 'no.'"). Conveniently, the user 102 may receive all notification messages 114 from the notification service 110 in a common format, regardless of their origin. For example, in some embodiments, notification messages 114 take the form of unified text notifications including, e.g., the text of the inquiry or request, followed by texts associated with the response options, which may be clickable or include instructions for the text that is to be typed by the user 102 in response. In application scenarios where the response options for all notifications can be sorted into the same abstract categories, the response options and associated texts themselves may be uniform. For example, if action items are extracted across all message channels 104 associated with a user 102, the notification messages may provide the generic response options "yes" (for accepting the action item), "no" (for rejecting the action item), or "escalate" (e.g., for forwarding the action item to the recipient's supervisor for reassignment or other suitable action). Alternatively, the number and type of response options, including the response texts, may vary based on the type of notification (e.g., task assignment vs. event reminder).

The notification service 110 acts as an intermediary between the message channels and/or tools 104/106 and the users 102 not only to pass detected action items 109 and/or actionable notifications 108 on to the users 102 in the form of notification messages 114, but also to receive responses 116 from the users 102 and update the message channels and/or tools 104/106 based on the responses 116. In many instances, the responses 116 are populated back into the channel 104 or sent back to the tool 106 from which the action item 109 or actionable notification 108 originated. However, in some cases, responses 116 may alternatively or additionally be provided to different message channels 104 or tools 106.

Figure 2:
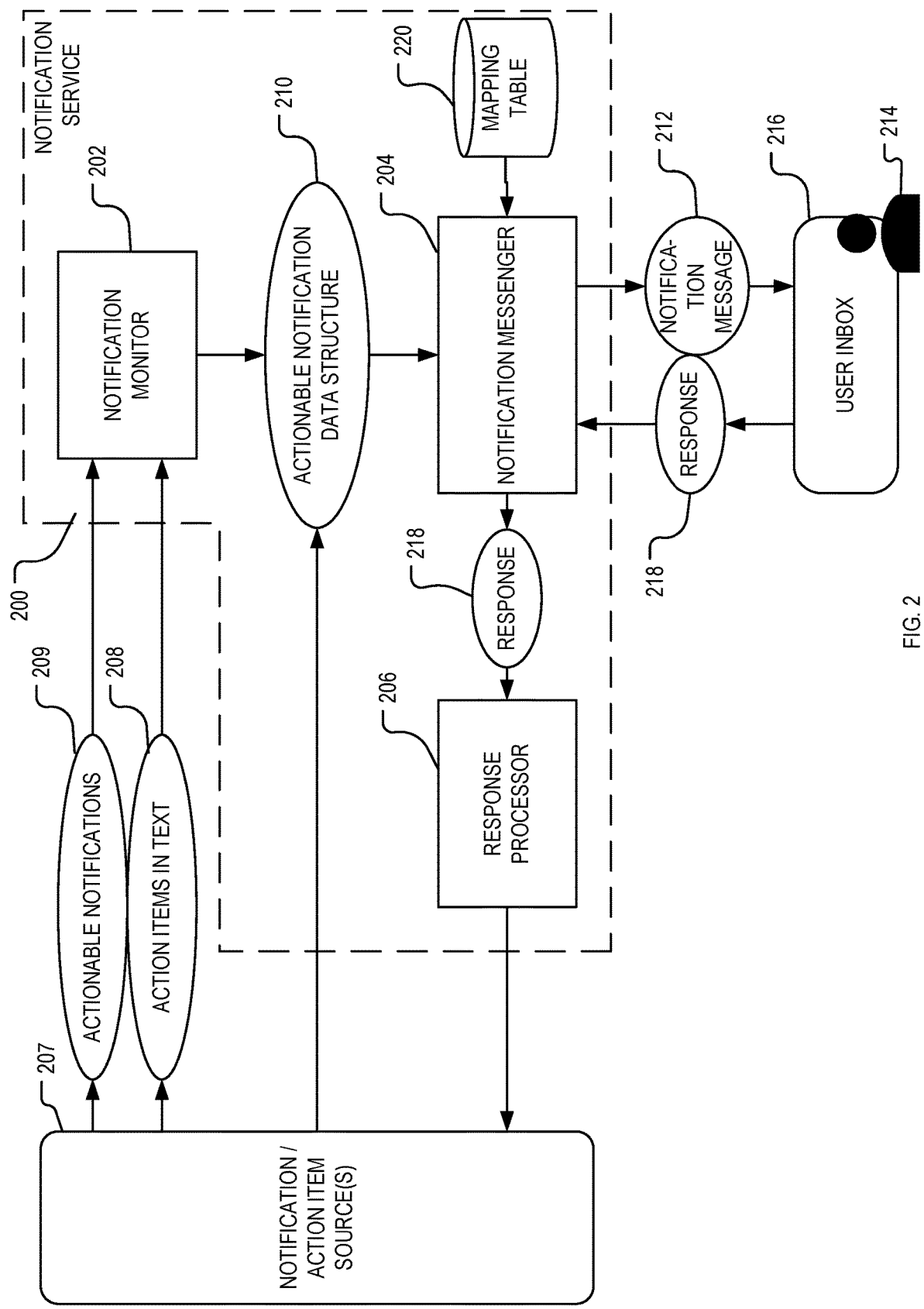
FIG. 2 is a schematic block diagram of an example notification service in accordance with various embodiments.

FIG. 2 illustrates, in more detail, an example notification service 200 (as may implement notification service 110) and its operation, in accordance with various embodiments. The notification service 200 is generally implemented in software executing on one or more (e.g., general-purpose) computers. It may be integrated into a communication and collaboration platform as described above with reference to FIG. 1. Alternatively, the notification service 200 may be provided as a stand-alone service that can interface, on one end, with a communication and collaboration platform or with other services that generate messages and notifications, and, on the other end, with the recipients of the messages.

The notification service 200 includes, as its major functional components (implemented as sets of software instructions and associated data structures), a notification monitor 202, a notification messenger 204, and a response processor 206. These components 202, 204, 206 may be wrapped into one comprehensive service 200, or may alternatively be provided as separate services, with suitable interfaces facilitating data exchange between them to function, collectively, as a notification service 200. The notification monitor 202 interfaces with sources 207 of notifications to detect and extract action items 208 from unstructured text and/or to receive or detect structured actionable notifications 209, and to convert all of those action items 208 and actionable notifications 209 into instances of a universal actionable notification data structure, the instances hereinafter for simplicity being referred to as "actionable notification data structures" 210. The notification service 200 may also receive actionable notification data structures 210 directly from sources 207. The notification messenger 204 operates on the actionable notification data structures 210 to generate notification messages 212 that are structured to include, in addition to the message text, multiple selectable response options. The notification messenger 204 further sends the notification messages 212 to the intended recipients 214 and/or their inboxes 216, and receives the recipients' responses 218, which it passes on to the response processor 206. In generating the notification messages 212 from the actionable notification data structures 210, the notification messenger 204 may consult a mapping table 220 that specifies different formats for the notification message 212 for different communication modes associated with the inbox 216 (or utilized by the recipient 214). The response processor 206 conveys the recipients' responses 218 back to the respective sources 207 of the action items 208 or actionable notifications 209 and/or to associated channels, tools, or services, and/or generates follow-up communications, as specified in the actionable notification data structures 210. The response processor 206 may also be configured to process the lack of a response over a specified time period measured from the time a notification message 212 was sent. For instance, when a user has not responded after, e.g., 24 h, the response processor 206 may initiate sending a reminder by way of a follow-up communication via the notification messenger 204, or, alternatively, treat the lack of a response by default as a "no."

The sources 207 of the action items 208 and actionable notifications 209 may be message channels 104 within, e.g., a communication and collaboration platform as described above with reference to FIG. 1 or a social or professional networking platform (such as, e.g., FACEBOOK or LINKEDIN) or similar service; tools 106 provided within such a platform; or stand-alone services that generate notifications (e.g., event planning services like EVITE that generate online invitations, appointment reminder services as utilized commonly by healthcare providers, task management applications that allow users to share task assignments, etc.). Thus, multiple different sources 207 may be multiple different "logical" message channels within a single application or service, or message channels (broadly understood) provided by multiple different applications or services. (Of course, a plurality of sources may also include both channels associated with multiple different applications/services and, for one or more of these applications/services, multiple logical channels associated with the same application/service.)

In accordance with various embodiments, the notification monitor 202 executes algorithms that allow it to discover action items 208 within unstructured text. These algorithms may utilize lists of keywords (e.g., "meeting," "invite," "task," "confirm") to trigger further analysis, in conjunction with (e.g., hand-coded, heuristic) rules to classify messages or message portions as pertaining to requests or inquiries that require a response (selected among discrete response options). Alternatively or additionally, action-item detection may utilize one or more machine-learning models, e.g., trained on sets of suitably labeled messages, to classify messages as including or not including an action item, and optionally as belonging to one of various action-item categories. Such machine-learning models may be based, e.g., on decision trees, Bayes classifiers, artificial neural networks, or other suitable machine-learning approaches, and may take a sequence of text as input to produce, as output, a classification along with any extracted requests or inquiries. Various machine-learning models for natural-language processing, and more specifically for intent detection, that may be used for this purpose are known to those of ordinary skill in the art. For any discovered action items, the notification monitor 202 may also determine possible answers or responses, e.g., by extracting them directly from the text, deriving them from the text in conjunction with other information sources, or retrieving them based on an action-item category from a database of predetermined response options. For example, if a message includes a polar (i.e., yes-no) question (such as "Will you attend?") or request (like "Please let me know whether you will attend."), the notification monitor 202 may generate "yes" and "no" as the response options.

Alternatively or additionally to extracting action items 208 from unstructured text, the notification monitor 202 may also detect messages that are at the outset structured as actionable notifications 209, as discernable from the body of the message or from metadata (e.g., as included in header files). For example, within a communication and collaboration platform, notifications generated by various tools, even if inserted into a general message channel, may be labeled as notifications and/or specify the tool that generated them in a textual tag or data field (e.g., subject line) of the message itself or a metadata field hidden from the user, but exposed to the notification service.

To facilitate the functions of the notification messenger 204 and response processor 207, the notification monitor 202 translates the action items 208 and actionable notifications 209 into actionable notification data structures 210 that are universal across all sources and types of actions items or notifications. The universal data structure may include separate fields, or arguments, for the text of the message to be sent to the user, the possible responses (which may form an array of variable size to accommodate different numbers of responses), and a list of recipients (which may likewise form an array of variable size). Further, the data structure may include a field specifying one or more actions to be performed upon receipt of the selected user response (e.g., to forward the response to the source), or pair every possible response with its own associated action (if different responses call for different actions), depending on the particular embodiment. The data structure may take the form of a single formatted string, a database entry (with different fields being stored in different columns of a table), or other. To provide one specific example, a string for the universal actionable notification data structure may be, e.g.:
(message_text; (response_1, action_1), . . . , (response_n, action_n); recipient_1, . . . , recipient_m).
In this example, each response is paired with a corresponding action in parentheses; a semicolon is used as a delimiter to separate the message text, list of response options and actions, and list of recipients; and commas are used to separate multiple response options and actions as well as multiple recipients within the respective lists. The arguments response_i (where i runs from 1 to n) may include the text associated with each response option, which may subsequently be included in the notification message 212, e.g., inline with the text or as a label applied to a graphic control element. The arguments action_i may include executable instructions, pointers to such instructions, or simply identifiers of the instructions as stored elsewhere. The arguments recipient_i may directly hold the addresses of the recipients (e.g., email addresses or phone numbers), or user identifiers based on which the addresses can be looked up. In some embodiments, the universal actionable notification data structure includes additional fields, e.g., for an argument specifying the type of notification (e.g., a task assignment vs. a reminder) or an argument specifying the source.

As noted above, the notification service 200 may also directly take in actionable notification data structures 210 at the input of the notification messenger 204 (side-stepping the notification monitor 202). For example, tools within a platform may be configured to directly generate actionable notification data structures 210 in the form used by the notification messenger 204, obviating the need for an additional conversion step performed by the notification monitor 202. Or, as another usage scenario, the notification service 200 may be provided as a service to other businesses and organizations (e.g., medical practices, schools, stores) that routinely send out notifications to customers/clients (herein broadly understood to include, e.g., patients, students, etc.) and/or to their employees. Instead of obtaining and maintaining their own custom software for bi-directionally communicating with customers/clients in an automated fashion to send, and receive responses to, notifications, these businesses and organizations can simply pass the relevant parameters of the notifications, such as the message text, number and types of responses, and addresses, to the notification service 200 in the form of, e.g., a string conforming to the universal actionable notification data structure 210 specified by the notification service 200, leaving it to the notification service 200 to generate notification messages 212 in the appropriate format for the communication mode utilized by the recipient.

Consider, for example, a physician's office that sends out appointment reminders to patients, for whom it has various types of contact information, e.g., email addresses for some and only phone numbers (with or without the ability to receive texts) for others. By abstracting the notification at the level of the actionable notification data structure 210, the physician's office is relieved of the need to operate a notification system that accommodates different modes of communication (or separate systems for email and text/phone notifications). It can simply pass an email address or phone number in the recipient field of the actionable notification data structure, and take advantage of the capabilities of the notification service 200 to translate the notification into an appropriate email or text message, or, if text messages are unsuccessful, even convert the text into an audio file to place a robocall to the patient. Further, the notification service 200 is in no way specific to the physician's office, but can similarly be used, for instance, by a school that wants to ask parents to sign their children up for an event. The content of the notification and the number and types of responses may vary, but the underlying actionable notification data structure 210 can be the same.

The notification messenger 204, when mapping an actionable notification data structure 210 to a notification message 212 for a given communication mode, determines the communication protocol applicable to the message (e.g., Simple Mail Transfer Protocol (SMTP) for an email, short-message peer-to-peer protocol (SMPP) for a text, HyperText Transfer Protocol (HTTP) for a web form, etc.), the applicable port to send the message to, and/or other parameters relevant to message exchange using the selected communication mode, and further translates the message text and response options to a format available in the communication mode. For example, to allow a recipient of an appointment reminder to confirm, cancel, or reschedule the appointment, an email or web form may include clickable buttons labeled "Confirm," "Cancel," or "Reschedule," whereas a text message may instruct the recipient to "Reply 'yes' to confirm and 'no' to cancel, or 'r' to reschedule," and a robocall may ask that the recipient "Press '1' to confirm your appointment, press '2' to cancel your appointment, or press '3' to reschedule your appointment." The communication mode to be used for a given user can, in some embodiments, be inferred from the recipient argument in the actionable notification data structure 210. For example, when an email address is passed to the notification messenger 204, this may indicate that the notification message 212 is to be sent by email. In other embodiments, the recipient argument merely identifies the user that is to receive the notification message 212, and the user's preferred communication mode is looked up in a separate database. For a registered user of a communication and collaboration platform, for instance, the user database may store, as part of the user's profile, whether the user prefers notifications to be sent my text, email, or both, or whether the user's phone supports texting. As will be appreciated, the notification service can support generating multiple notification messages 212 from a single actionable notification data structure 210 to redundantly notify the user via multiple communication modes.

Upon receipt of the user's response, the response processor 206 takes one or more actions specified in the actionable notification data structure and/or informed by business logic contained within the response processor 206. In an example, one action will be to pass the response on to the source of the action item or actionable notification, or a sub-part or associated component. For example, when an action item is extracted from a message in a message channel, the response processor 206 may populate the response 218 back to that channel by generating and placing a response message into the channel. Alternatively or additionally, the response may be provided to other channels and/or tools, as specified in the action argument within the actionable notification data structure 210. For example, where an actionable notification calls on the recipient to select one of multiple proposed time slots for a meeting, the response may be not only forwarded to the message channel from which the scheduling request was extracted, but also used to update both the receiving and the sending users' calendars. In embodiments where the notification service 200 is integrated within a larger platform providing the message channels and tools, the business logic for determining such updating actions may be provided, for example, in the notification monitor 202 and translated into an instruction passed along within the actionable notification data structure 210. Actions may differ between different responses to a given request. For instance, an appointment reminder service interfacing (as the source 207 of the notification) with the notification service 200 may specify that confirmation of an appointment is simply relayed back to the appointment reminder service, whereas a rescheduling request is sent to an associated rescheduling service (or sub-service of the appointment reminder service).

In some embodiments, certain responses may also trigger follow-up communications by the notification service. For example, when an employee of an organization sends out an inquiry to colleagues whether anyone is willing to swap shifts, once a recipient replies "yes," the notification service may send a follow-up communication to all other recipients of the original notification message, indicating that the shift has been taken. Such action may be based on a general action parameter that indicates a permissible number of positive responses to the message, the number being, in this case, one. Similar logic can be employed, as just another example, to assign a fixed number of items (e.g., promotional items or gifts) or spots (e.g., for attending a conference) available to a group of people on a first-come-first-serve basis; in this case, the number of available items/spots is the permissible number of positive responses to a general inquiry whether a user would like to receive the item or claim the spot. Reponses may also be aggregated to flow as input into auto-generated messages or other processing. For instance, an actionable notification may poll multiple users, e.g., concerning their restaurant preferences for a get-together, providing multiple choices. The response processor may count votes for each restaurant and convey the votes in the aggregate, or simply the top choice, in a single message posted to the message channel from which the poll originated. Other examples of follow-up communications or other processing actions to be taken by the response processor 206 will occur to those of ordinary skill in the art.

Figure 3:
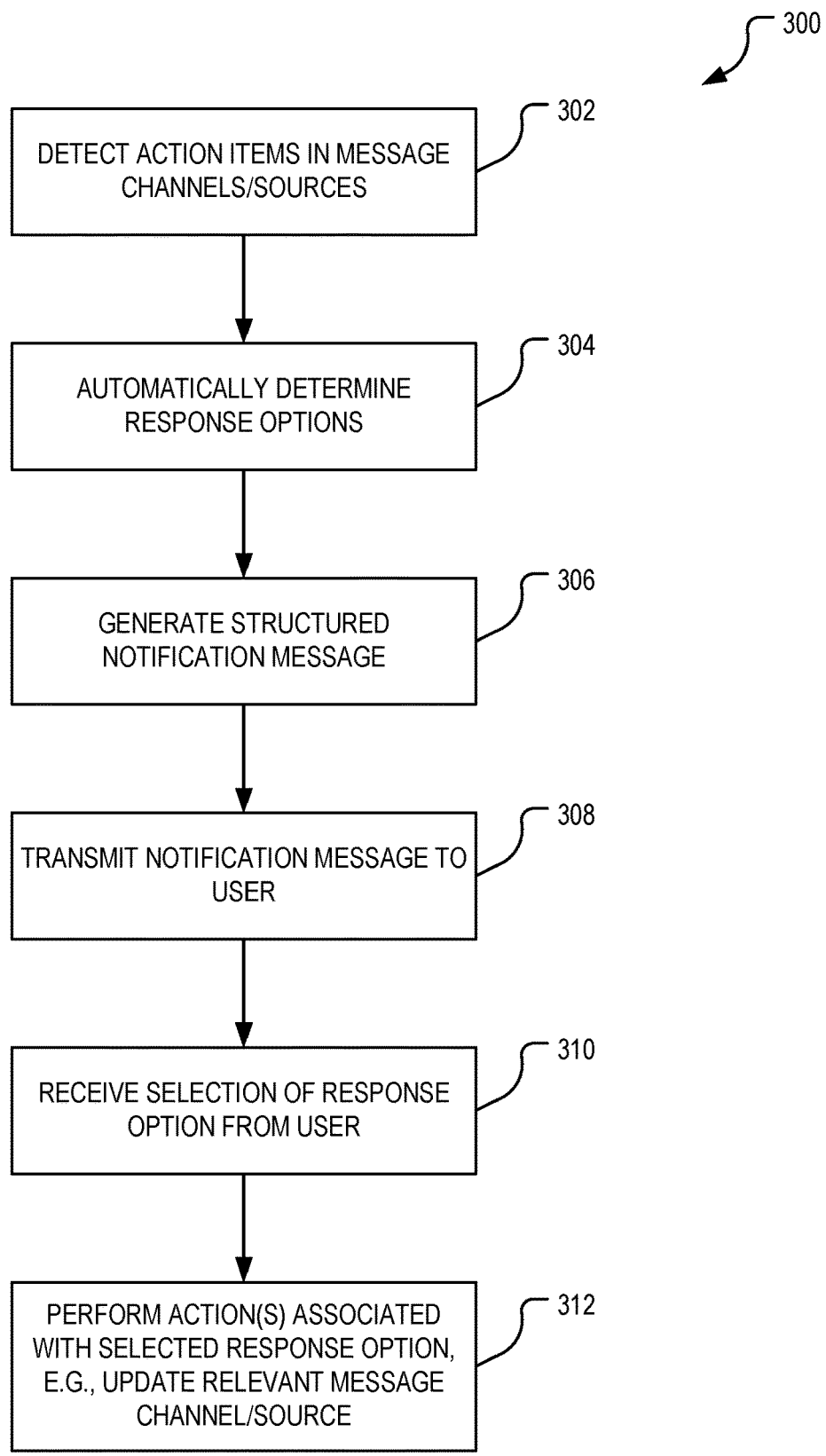
FIG. 3 is a flow chart of an example method for aggregating action items for a given user across message channels and converting the action items to actionable notification messages, in accordance with various embodiment.

FIG. 3 is a flow chart illustrating an example method 300 in which the notification service 200 serves to aggregate action items for a given user across sources (e.g., logical message channels or applications/services) and converting the action items to actionable notification messages. The method 300 involves monitoring a plurality of sources to detect, in the unstructured text of messages posted to those channels, action items assigned to the user (operation 302). For each of the detected action items, a plurality of response options are automatically determined (e.g., based on the message text itself and/or other information) (operation 304). The detection of action items and/or the determination of response options may utilize machine-learning or rules-based algorithms, e.g., as described above. From the multiple action items, structured notification messages that share a common format are generated (operation 306). This operation may involve first populating, for each action item, an actionable notification data structure including a message text, response options and associated actions, and recipient(s) as arguments, and then converting that data structure, based on a communication mode associated with the recipient, to a respective notification message. Each notification message is structured to include, in addition to the message text, the response options, either in directly selectable (e.g., clickable) form or accompanied by instructions on how to select the response (e.g., instructions for the reply to be sent for each option).

The notification messages are transmitted to the user via the communication mode, and aggregated at an associated central location that is generally outside the source (e.g., message channel) from which the action items are extracted (operation 308). For example, all messages may be sent to the user via email or text, and aggregated in the respective inbox. A reply by the user in the manner prescribed by the notification message acts as the user's selection of one of the response options. Upon receipt of the selected response option (at operation 310), the notification service performs one or more actions associated with the selected response (operation 312), which include updating the source (e.g., message channel) in which the action item was detected accordingly. Additional actions may include updating a different source (e.g., different message channel) to which the response is likewise relevant, transmitting the response to a software tool that may be used to further performance of the assigned action item (e.g., by writing an accepted meeting to the user's calendar), or generating follow-up messages to the user.

Figure 4:
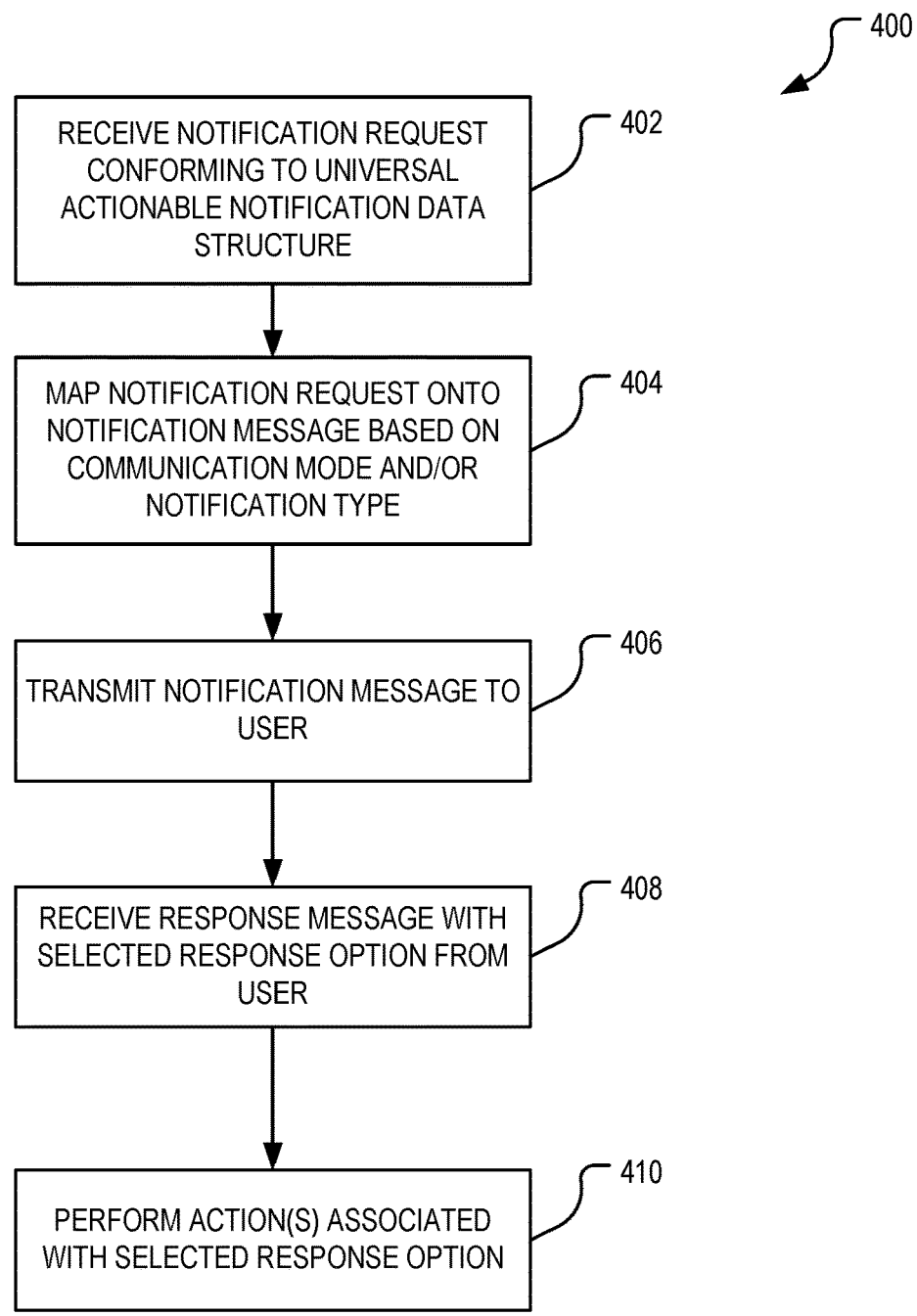
FIG. 4 is a flow chart of an example method converting actionable notifications into notification messages based on communication modes associated with the recipients, in accordance with various embodiments.

FIG. 4 is a flow chart that illustrates an example method 400 in which the notification service 200 serves to convert actionable notifications into notification messages based on communication modes associated with the recipients, providing a layer of abstraction that frees the senders of the notifications from the need to customize the message for each recipient. The method 400 begins with receiving, at the notification service 200, a notification request conforming to a universal actionable notification data structure, which includes the message text, one or more response options each paired with an associated action (or set of actions), and one or more recipient addresses (operation 402). Optionally, the notification request may also specify the type of notification (e.g., task, invitation, scheduling request, etc.) Each notification request is mapped, based on a communication mode associated with the recipient address (which may be, e.g., a phone number or email address) and, if applicable, further based on the type of notification, to a notification message including selectable response options (operation 404), which is then transmitted to the respective recipient (operation 406). Upon receipt of a response message from the user (operation 408), the automated action(s) associated with the selected response option is (are) performed (410).

As will be apparent from the foregoing description, online communication and collaboration platforms present, when it comes to improving user convenience and application scope, a number of technical challenges related to aggregating a wide variety of notifications across multiple disparate sources. For example, different formatting and communication requirements for notifications for the disparate sources present problems integrating different notification sources as each notification source requires dedicated processing and handling. The technical problems are solved by seamlessly aggregating notifications across multiple potentially disparate sources, freeing users (and the user-facing applications and services they utilize) from the need to structure action items and notifications in a particular manner, and/or removing limitations tied to a specific communication mode for transmitting the messages (e.g., text at the exclusion of email or vice versa).

In accordance with various embodiments, aggregation of notifications across multiple sources is achieved by implementing a notification service that acts as an intermediary between sources and recipients of notifications, taking in actionable notifications or action items and sending them, in the form of notification messages, to a user's inbox, and, conversely, distributing responses received from the user to their applicable destinations. A resulting technical effect is that notifications sent from any source communicatively connected to the notification service end up, and can be operated on, in a central location associated with the user.

Further, in accordance with some embodiments, the need to adhere to a particular notification structure is eliminated by functionality for the auto-discovery of action items in unstructured text, along with auto-generation of suitable response options; such functionality can be achieved with machine-learning-based or other algorithms. Further, in accordance with various embodiments, limitations on message formats and communication modes are alleviated by equipping the notification service with capabilities for converting incoming notifications into a universal actionable notification data structure and for translating those actionable notification data structures into a desired notification message format, e.g., employing a mapping table that specifies formats for different communication modes. The notification data structure carries the substantive meaning and associated function of the message, which may include the message text, multiple response options, as well as actions to be taken by the system responsive to selection of each of the response options, whereas the mapping table stores the formatting specifics. A technical effect is that meaning and function of actionable notifications are abstracted and separated from the specific format and manner in which notification messages are transmitted, rendering it straightforward to accommodate new formats and communication modes as needed with little overhead (e.g., by adding an entry for the new format into the mapping table). Another effect is that a message directed to multiple recipients can be sent via multiple different communication modes without affecting how the notification source interfaces with the notification service. As a consequence, convenience for recipients is likewise increased, as recipients can individually choose the communication mode through which they will receive notification messages.

In general, the operations, algorithms, and methods described herein may be implemented in any suitable combination of software, hardware, and/or firmware, and the provided functionality may be grouped into a number of components, modules, or mechanisms. Modules and components can constitute either software components (e.g., code embodied on a non-transitory machine-readable medium) or hardware-implemented components. A hardware-implemented component is a tangible unit capable of performing certain operations and can be configured or arranged in a certain manner. In example embodiments, one or more computer systems (e.g., a standalone, client, or server computer system) or one or more processors can be configured by software (e.g., an application or application portion) as a hardware-implemented component that operates to perform certain operations as described herein.

In various embodiments, a hardware-implemented component can be implemented mechanically or electronically. For example, a hardware-implemented component can comprise dedicated circuitry or logic that is permanently configured (e.g., as a special-purpose processor, such as a field programmable gate array (FPGA) or an application-specific integrated circuit (ASIC)) to perform certain operations. A hardware-implemented component can also comprise programmable logic or circuitry (e.g., as encompassed within a general-purpose processor or other programmable processor) that is temporarily configured by software to perform certain operations. It will be appreciated that the decision to implement a hardware-implemented component mechanically, in dedicated and permanently configured circuitry, or in temporarily configured circuitry (e.g., configured by software) can be driven by cost and time considerations.

Accordingly, the term "hardware-implemented component" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented components are temporarily configured (e.g., programmed), each of the hardware-implemented components need not be configured or instantiated at any one instance in time. For example, where the hardware-implemented components comprise a general-purpose processor configured using software, the general-purpose processor can be configured as respective different hardware-implemented components at different times. Software can accordingly configure a processor, for example, to constitute a particular hardware-implemented component at one instance of time and to constitute a different hardware-implemented component at a different instance of time.

Hardware-implemented components can provide information to, and receive information from, other hardware-implemented components. Accordingly, the described hardware-implemented components can be regarded as being communicatively coupled. Where multiple such hardware-implemented components exist contemporaneously, communications can be achieved through signal transmission (e.g., over appropriate circuits and buses that connect the hardware-implemented components). In embodiments in which multiple hardware-implemented components are configured or instantiated at different times, communications between such hardware-implemented components can be achieved, for example, through the storage and retrieval of information in memory structures to which the multiple hardware-implemented components have access. For example, one hardware-implemented component can perform an operation and store the output of that operation in a memory device to which it is communicatively coupled. A further hardware-implemented component can then, at a later time, access the memory device to retrieve and process the stored output. Hardware-implemented components can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented components that operate to perform one or more operations or functions. The components referred to herein can, in some example embodiments, comprise processor-implemented components.

Similarly, the methods described herein can be at least partially processor-implemented. For example, at least some of the operations of a method can be performed by one of processors or processor-implemented components. The performance of certain of the operations can be distributed among the one or more processors, not only residing within a single machine, but deployed across a number of machines. In some example embodiments, the processor or processors can be located in a single location (e.g., within an office environment, or a server farm), while in other embodiments the processors can be distributed across a number of locations.

The one or more processors can also operate to support performance of the relevant operations in a "cloud computing" environment or as a "software as a service" (SaaS). For example, at least some of the operations can be performed by a group of computers (as examples of machines including processors), these operations being accessible via a network (e.g., the Internet) and via one or more appropriate interfaces (e.g., application program interfaces (APIs)).

Example embodiments can be implemented in digital electronic circuitry, in computer hardware, firmware, or software, or in combinations of them. Example embodiments can be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of description language, including compiled or interpreted languages, and it can be deployed in any form, including as a standalone program or as a component, subroutine, or other unit suitable for use in a computing environment. A computer program can be deployed to be executed on one computer or on multiple computers at one site or distributed across multiple sites and interconnected by a communication network.

In example embodiments, operations can be performed by one or more programmable processors executing a computer program to perform functions by operating on input data and generating output. Method operations can also be performed by, and apparatus of example embodiments can be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware can be a design choice. Below are set out hardware (e.g., machine) and software architectures that can be deployed, in various example embodiments.

Figure 5:
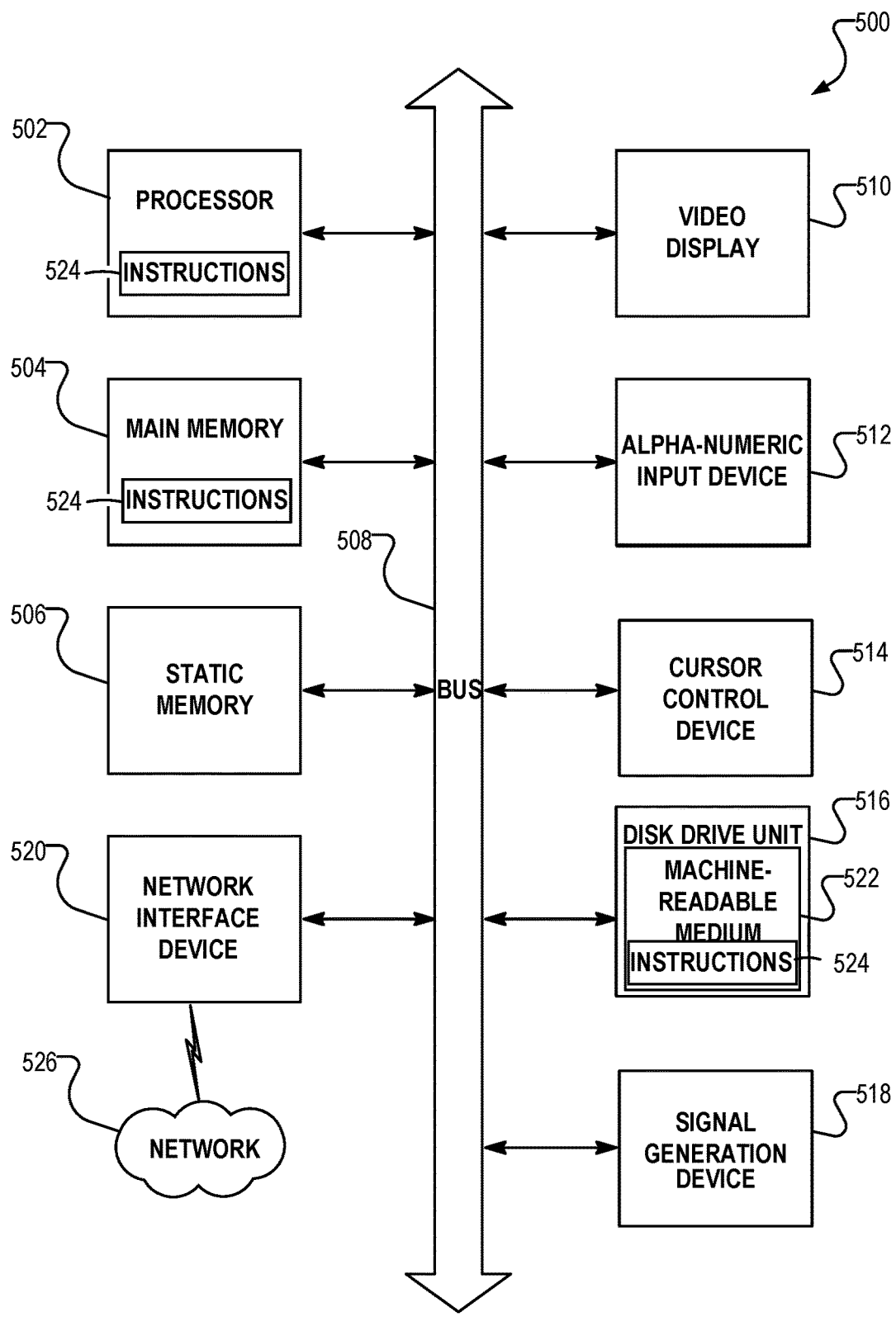
FIG. 5 is a block diagram of an example computing system as may be used to implement components of the messaging ecosystem and notification service of FIGS. 1 and 2, in accordance with various embodiments.

FIG. 5 is a block diagram of an example computing system as may be used to implement the systems of FIGS. 1 and 2 and perform the methods of FIGS. 3 and 4, in accordance with various embodiments. In alternative embodiments, the computing system may be a machine operating as a standalone device or, alternatively, connected (e.g., networked) to other machines. In a networked deployment, the machine can operate in the capacity of a server or a client machine in server-client network environment, or as a peer machine in a peer-to-peer (or distributed) network environment. The machine can be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU), or both), a main memory 504, and a static memory 506, which communicate with each other via a bus 508. The computer system 500 can further include a video display 510 (e.g., a liquid crystal display (LCD) or a cathode ray tube (CRT)). The computer system 500 also includes an alpha-numeric input device 512 (e.g., a keyboard or a touch-sensitive display screen), a user interface (UI) navigation (or cursor control) device 514 (e.g., a mouse), a disk drive unit 516, a signal generation device 518 (e.g., a speaker), and a network interface device 520.

The disk drive unit 516 includes a machine-readable medium 522 on which are stored one or more sets of data structures and instructions 524 (e.g., software) embodying or utilized by any one or more of the methodologies or functions described herein. The instructions 524 can also reside, completely or at least partially, within the main memory 504 and/or within the processor 502 during execution thereof by the computer system 500, with the main memory 504 and the processor 502 also constituting machine-readable media.

While the machine-readable medium 522 is shown in an example embodiment to be a single medium, the term "machine-readable medium" can include a single medium or multiple media (e.g., a centralized or distributed database, and/or associated caches and servers) that store the one or more instructions 524 or data structures. The term "machine-readable medium" shall also be taken to include any tangible medium that is capable of storing, encoding, or carrying instructions 524 for execution by the machine and that cause the machine to perform any one or more of the methodologies of the present disclosure, or that is capable of storing, encoding, or carrying data structures utilized by or associated with such instructions 524. The term "machine-readable medium" shall accordingly be taken to include, but not be limited to, solid-state memories, and optical and magnetic media. Specific examples of machine-readable media 522 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

The instructions 524 can be transmitted or received over a communication network 526 using a transmission medium. The instructions 524 can be transmitted using the network interface device 520 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi and WiMax networks). The term "transmission medium" shall be taken to include any intangible medium that is capable of storing, encoding, or carrying instructions 524 for execution by the machine, and includes digital or analog communications signals or other intangible media to facilitate communication of such software.

The following numbered examples are illustrative embodiments.

1. A method, performed by a notification service implemented with machine-readable instructions executed by one or more computer processors, for exchanging messages with users based on action items assigned to the users, the method comprising: detecting, in unstructured text of messages posted to a plurality of sources, multiple action items assigned to a user; determining, for each of the detected action items, a plurality of response options; generating, from the multiple action items, respective structured notification messages that share a common format, the notification messages each comprising the plurality of response options determined for the respective action item; causing transmission of the structured notification messages to the user; receiving a response message to at least one of the structured notification messages from the user, the response message specifying a response option selected among the respective plurality of response options; and updating, based on the selected response option, the source in which the respective action item was detected.

2. The method of example 1, wherein the plurality of sources comprises at least one of multiple logical message channels or multiple applications or services.

3. The method of claim 1 or example 2, wherein generating the structured notification messages comprises: converting the multiple action items into respective instances of a universal actionable notification data structure that specify the plurality of response options and associated sets of actions, the sets of actions comprising the updating of the respective sources; and converting the instances of the universal actionable notification data structure into the respective structured notification messages.

4. The method of example 3, wherein the sets of actions associated with the response options are based at least in part on a type of action item.

5. The method of any of examples 1-4, wherein updating the source comprises posting a response message based on the selected response option to the source.

6. The method of any of examples 1-5, further comprising updating a source of the plurality of sources other than the message channel in which the respective action item was detected.

7. The method of any of examples 1-6, further comprises at least one of causing the response to be transmitted to a software tool associated with a type of the respective action item, or generating and causing transmission of a follow-up message to the user.

8. The method of any of examples 1-7, wherein the structured notification messages are sent using a communication mode associated with the user, and wherein the common format is based at least in part on the communication mode.

9. The method of any of examples 1-8, wherein the communication mode is one of email, short message service (SMS), web form, or telephone call.

10. The method of any of examples 1-9, wherein the plurality of action items are detected with a machine-learned classifier model trained on labeled messages.

11. The method of any of examples 1-10, wherein the action items comprise at least one of task assignments, invitations, appointment confirmation requests, and scheduling requests, and polls.

12. A computer system for exchanging messages with users based on action items assigned to the users, the system comprising: one more computer processors; and one or more machine-readable media storing instructions which, when executed by the one or more computer processors, cause the one or more computer processors to perform operations comprising: detecting, in unstructured text of messages posted to a plurality of sources, multiple action items assigned to a user; determining, for each of the detected action items, a plurality of response options; generating, from the multiple action items, respective structured notification messages that share a common format, the notification messages each comprising the plurality of response options determined for the respective action item; causing transmission of the structured notification messages to the user; receiving a response message to at least one of the structured notification messages from the user, the response message specifying a response option selected among the respective plurality of response options; and updating, based on the selected response option, the source in which the respective action item was detected.

13. The system of example 12, wherein generating the structured notification messages comprises: converting the multiple action items into respective instances of a universal actionable notification data structure that specify the plurality of response options and associated sets of actions, the sets of actions comprising updating of the respective sources; and converting the instances of the universal actionable notification data structure into the respective structured notification messages.

14. The system of example 13, wherein the sets of actions associated with the response options are based at least in part on a type of action item.

15. The system of example 13 or example 14, wherein the set of actions associated with the selected response option further comprises updating a message channel of the plurality of sources other than the message channel in which the respective action item was detected.

16. The system of any of examples 13-15, wherein the set of actions associated with the selected response option further comprises at least one of causing the response to be transmitted to a software tool associated with a type of the respective action item, or generating and causing transmission of a follow-up message to the user.

17. The system of any of examples 12-16, wherein the structured notification messages are sent using a communication mode associated with the user, and wherein the common format is based at least in part on the communication mode, the communication mode being one of email, short message service (SMS), web form, or telephone call.

18. The system of any of examples 12-17, wherein the plurality of action items are detected with a machine-learned classifier model trained on labeled messages.

19. The system of any of examples 12-18, wherein the action items comprise at least one of task assignments, invitations, appointment confirmation requests, and scheduling requests, and polls.

20. A machine-readable medium storing instructions implementing a notification service for exchanging messages with users based on action items assigned to the users, the instructions, when executed by one or more computer processors, cause the one or more computer processors to perform operations comprising: detecting, in unstructured text of messages posted to a plurality of sources, multiple action items assigned to a user; determining, for each of the detected action items, a plurality of response options; generating, from the multiple action items, respective structured notification messages that share a common format, the notification messages each comprising the plurality of response options determined for the respective action item; causing transmission of the structured notification messages to the user; receiving a response message to at least one of the structured notification messages from the user, the response message specifying a response option selected among the respective plurality of response options; and updating, based on the selected response option, the source in which the respective action item was detected.

Although embodiments have been described with reference to specific example embodiments, it will be evident that various modifications and changes may be made to these embodiments without departing from the broader scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This description, therefore, is not to be taken in a limiting sense, and the scope of various embodiments is defined only by the appended claims, along with the full range of equivalents to which such claims are entitled.

What is claimed is:

1. A method, performed by a notification service implemented with machine-readable instructions executed by one or more computer processors, for managing action items derived from messages exchanged between user groups of a network-based collaboration platform, the method comprising:
   detecting, based on unstructured text of messages posted to a first conversation thread associated with a first user group, a first action item assigned to a user;
   detecting, based on unstructured text of messages posted to a second conversation thread associated with a second user group, a second action item assigned to the user;
   determining, for each of the detected first and second action items, a plurality of response options;
   generating, from the first and second action items, respective first and second structured notification messages addressed to the user, the notification messages each comprising the plurality of response options determined for the respective action item;
   posting the first and second structured notification messages addressed to the user in a notification inbox provided to the user;
   receiving a response to at least the first structured notification message from the user within the notification inbox, the response specifying a response option selected among the respective plurality of response options; and
   generating, based on the selected response option, a response message, and placing the response message into the first conversation thread.

2. The method of claim 1, wherein generating the structured notification messages comprises:
   converting the first and second action items into respective first and second instances of a universal actionable notification data structure that specify the plurality of response options and associated sets of actions, the sets of actions of the first instance comprising the generating and posting of the response message; and
   converting the first and second instances of the universal actionable notification data structure into the respective first and second structured notification messages.

3. The method of claim 2, wherein the sets of actions associated with the response options are based at least in part on a type of action item.

4. The method of claim 1, further comprises posting the response message to at least one conversation thread other than the first conversation thread.

5. The method of claim 1, further comprising, based on the selected response option, at least one of causing the response to be transmitted to a software tool associated with a type of the first action item, or generating and causing transmission of a follow-up message to the user.

6. The method of claim 1, wherein the first and second action items are detected with a machine-learned classifier model trained on labeled messages.

7. The method of claim 1, wherein the first and second action items comprise at least one of task assignments, invitations, appointment confirmation requests, scheduling requests, and polls.

8. A computer system for managing action items derived from messages exchanged between user groups of a network-based collaboration platform, the system comprising:
   one more computer processors; and
   one or more machine-readable media storing instructions which, when executed by the one or more computer processors, cause the one or more computer processors to perform operations comprising:
- detecting, based on unstructured text of messages posted to a first conversation thread associated with a first user group, a first action item assigned to a user;
- detecting, based on unstructured text of messages posted to a second conversation thread associated with a second user group, a second action item assigned to the user;
- determining, for each of the detected first and second action items, a plurality of response options;
- generating, from the first and second action items, respective first and second structured notification messages addressed to the user, the notification messages each comprising the plurality of response options determined for the respective action item;
- posting the first and second structured notification messages addressed to the user to a notification inbox provided to the user;
- receiving a response to at least the first structured notification message from the user within the notification inbox, the response specifying a response option selected among the respective plurality of response options; and
- generating, based on the selected response option, a response message, and placing the response message into the first conversation thread.

9. The system of claim 8, wherein generating the structured notification messages comprises:
- converting the first and second action items into respective first and second instances of a universal actionable notification data structure that specify the plurality of response options and associated sets of actions, the sets of actions of the first instance comprising the generating and posting of the response message; and
- converting the first and second instances of the universal actionable notification data structure into the respective first and second structured notification messages.

10. The system of claim 9, wherein the sets of actions associated with the response options are based at least in part on a type of action item.

11. The system of claim 9, wherein the set of actions associated with the selected response option further comprises posting the response message to at least one conversation thread other than the first conversation thread.

12. The system of claim 9, wherein the set of actions associated with the selected response option further comprises at least one of causing the response to be transmitted to a software tool associated with a type of the first action item, or generating and causing transmission of a follow-up message to the user.

13. The system of claim 8, wherein the first and second action items are detected with a machine-learned classifier model trained on labeled messages.

14. The system of claim 8, wherein the action items comprise at least one of task assignments, invitations, appointment confirmation requests, scheduling requests, and polls.

15. A machine-readable medium storing instructions implementing a notification service for managing action items derived from messages exchanged between user groups of a network-based collaboration platform, the instructions, when executed by one or more computer processors, causing the one or more computer processors to perform operations comprising:
- detecting, based on unstructured text of messages posted to a second conversation thread associated with a second user group, a second action item assigned to the user;
- determining, for each of the detected first and second action items, a plurality of response options;
- generating, from the first and second action items, respective first and second structured notification messages addressed to the user, the notification messages each comprising the plurality of response options determined for the respective action item;
- posting the first and second structured notification messages addressed to the user in a notification inbox provided to the user;
- receiving a response to at least the first structured notification message from the user within the notification inbox, the response specifying a response option selected among the respective plurality of response options; and
- generating, based on the selected response option, a response message, and placing the response message into the first conversation thread.

* * * * *